Sept. 8, 1925.

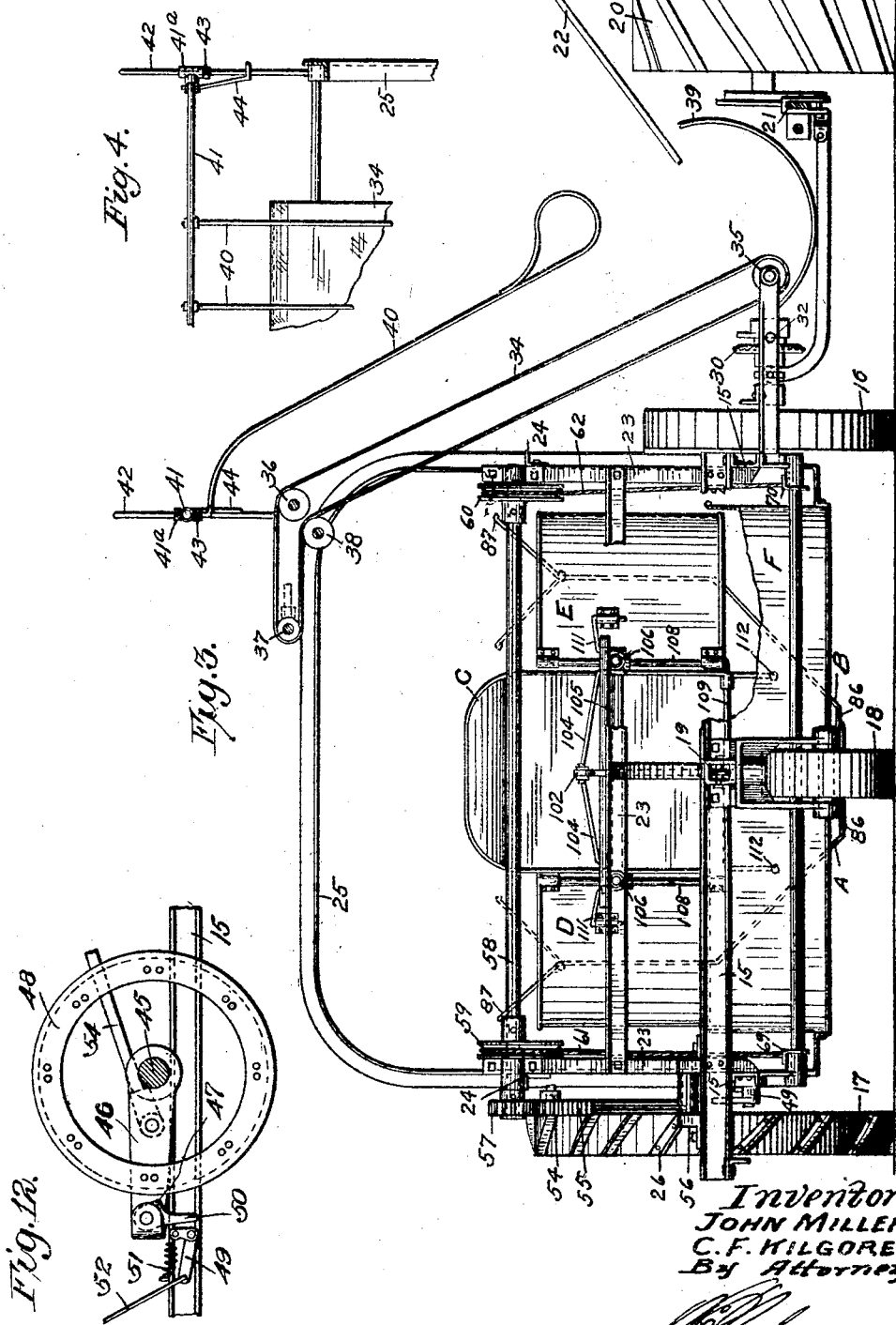

J. MILLER ET AL 1,552,633

SHOCKING MACHINE

Filed Feb. 9, 1924    5 Sheets-Sheet 1

Inventors
JOHN MILLER
C. F. KILGORE
By Attorney

Sept. 8, 1925.  J. MILLER ET AL  1,552,633
SHOCKING MACHINE
Filed Feb. 9, 1924   5 Sheets-Sheet 3

Inventors
John Miller
C. F. Kilgore
By Attorney

Sept. 8, 1925.  
J. MILLER ET AL  
SHOCKING MACHINE  
Filed Feb. 9, 1924  
1,552,633  
5 Sheets-Sheet 4

Inventors  
JOHN MILLER  
C. F. KILGORE  
By Attorney

Sept. 8, 1925. 1,552,633
J. MILLER ET AL
SHOCKING MACHINE
Filed Feb. 9, 1924 5 Sheets-Sheet 5
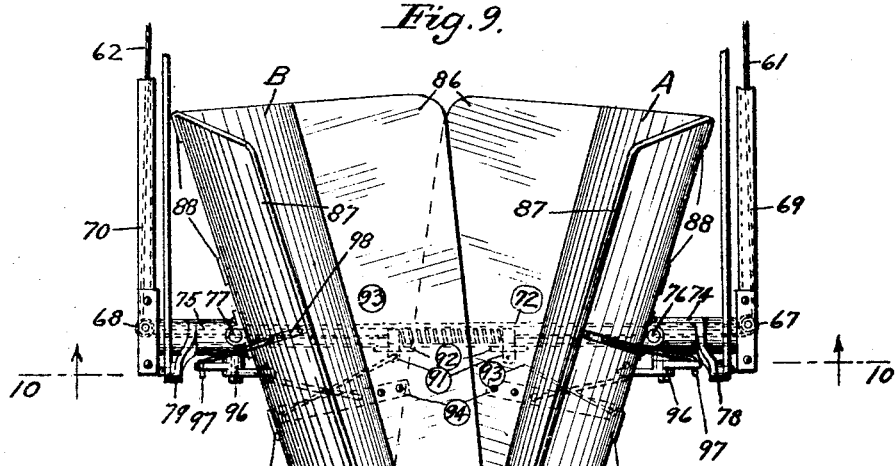
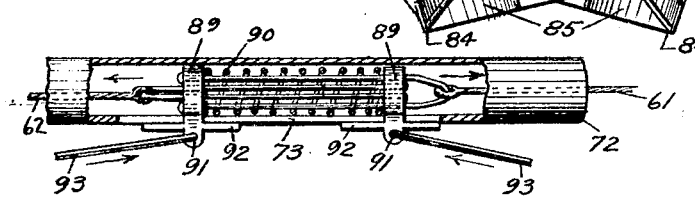
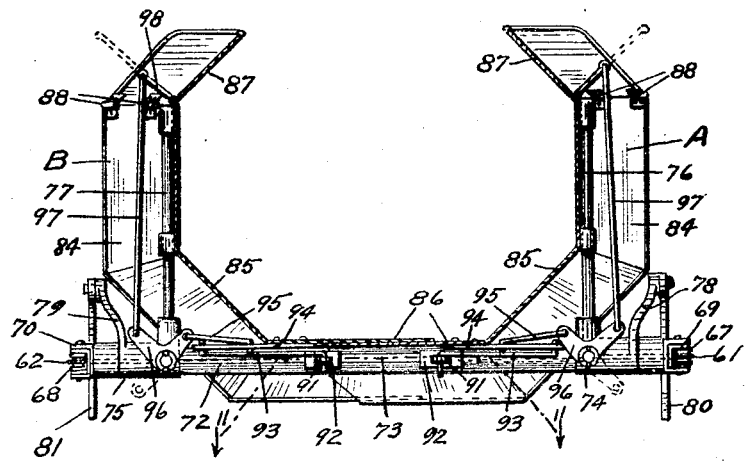
Inventors
JOHN MILLER
C. F. KILGORE
By Attorney Patented Sept. 8, 1925.

1,552,633

UNITED STATES PATENT OFFICE.

JOHN MILLER, OF CALVIN, NORTH DAKOTA, AND CHARLES F. KILGORE, OF MINNEAPOLIS, MINNESOTA, ASSIGNORS, BY DIRECT AND MESNE ASSIGNMENTS, OF ONE-FIFTEENTH TO MARK I. FORKNER AND ONE-FIFTEENTH TO BERT E. GROOM, BOTH OF LANGDON, NORTH DAKOTA; TWO-FIFTEENTHS TO H. L. HOGAN, FOUR-FIFTEENTHS TO E. H. LARSON, AND ONE-FIFTEENTH TO GEORGE BROWN, ALL OF CLYDE, NORTH DAKOTA; TWO-FIFTEENTHS TO W. L. THOMAS AND TWO-FIFTEENTHS TO HENRY SCHULTZ, BOTH OF CALVIN, NORTH DAKOTA.

SHOCKING MACHINE.

Application filed February 9, 1924. Serial No. 691,626.

*To all whom it may concern:*

Be it known that we, JOHN MILLER, of Calvin, in the county of Cavalier and State of North Dakota, and CHARLES F. KILGORE, of Minneapolis, in the county of Hennepin and State of Minnesota, both citizens of the United States, have invented certain new and useful Improvements in Shocking Machines, of which the following is a specification.

This invention relates to shocking machinery and the main object is to provide a practical, efficient and highly novel machine, adapted to be drawn alongside of a binder, to receive bundles of grain therefrom, and to form said bundles into shocks which are then delivered to and arranged upon the ground in substantially the same but in a more efficient and uniform manner than has been done heretofore by hand; thus decreasing the amount of labor ordinarily required for harvesting and increasing the number of shocks that may be made each day for each man employed, and, consequently greatly reducing the operating expenses upon the farm at this season of the year when labor is usually at a high premium. Further and more specific objects will be disclosed in the course of the following specification, reference being had to the accompanying drawings, wherein like characters refer to like elements in the various figures, and wherein:

Fig. 3 is a front elevation of the machine.

Fig. 4 is a fractional detail elevation as seen from the right, in Fig. 3.

Fig. 9 is a plan elevation of the basket sections showing how they are brought together when forming the shock.

Fig. 10 is a sectional elevation as seen substantially on the line 10—10 in Fig. 9.

Fig. 11 is an enlarged sectional detail view on the line 11—11 in Fig. 10.

Fig. 12 is a fractional detail view of a tripping mechanism, later to be described.

Figure 1:
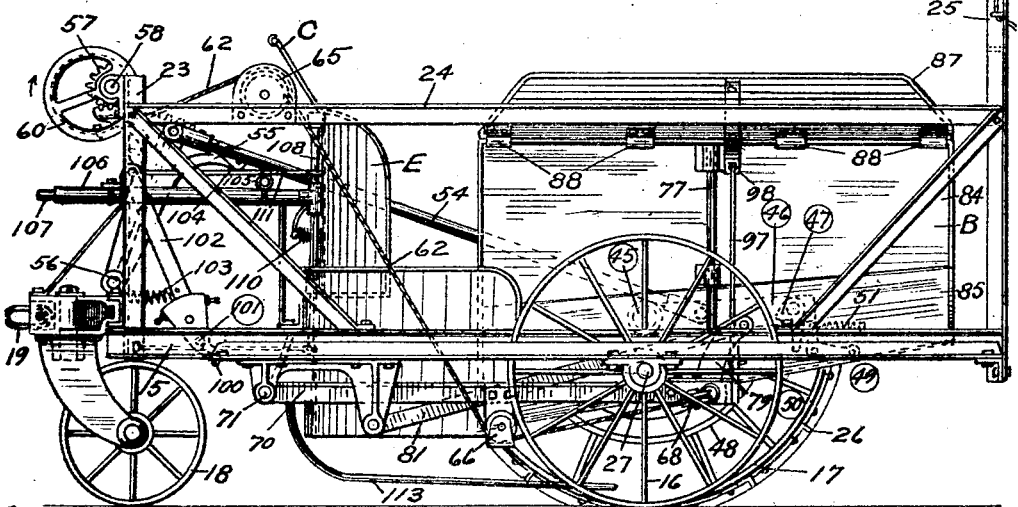
Fig. 1 is a left side elevation of the machine, with the bundle basket in its receiving or normal position some parts being removed for purpose of illustration.

Referring to the drawings more particularly and by reference characters 15 designates a main frame which is supported by side wheels 16 and 17 and a front caster wheel 18. The machine has a clevis link 19 by which it is drawn, and may be drawn independently of the binder, or may be connected by a suitable equalizer (not shown) with the binder, so as to be drawn therewith. The position of the binder, with respect to the machine, is indicated in Figs. 3 and 5, where the bull wheel 20, the frame 21, and the bundle board 22 of a standard construction of binder are shown.

The frame 15 is provided at its front end with a portion 23 which is connected by horizontal rails 24 to a rear arch 25 all the frame parts being rigidly connected together and braced, as shown in the drawings. The wheels 16 and 17 are independently mounted on stub shafts journaled in the main frame, and although power is transmitted from both wheels it is only necessary to provide the latter with traction lugs 26 as that wheel has by far the heavier duty to perform.

The shaft 27, of the wheel 16, has a clutch 28, actuated by a lever 29, which throws it into and out of engagement, in a manner later to be described, with a bevel gear 30, which meshes with a bevel pinion 31 and drives a shaft 32, having a sprocket gear 33, at its outer end. The sprocket gear 33, through any suitable driving connection, drives an endless conveyor 34, which operates over rollers 35, 36, 37 and 38. The object of the conveyor is to carry bundles, dropped into the pan 39 from the bundle board 22 of the binder, up to a suitable height, and drop them into the bundle basket where they are formed into shocks. A series of guide bars 40 are arranged over and substantially parallel with the upper run of the conveyor, to cause the bundles to be properly elevated in succession over the carrier to the basket, and to prevent them from rolling back on the conveyor, which is necessarily quite steep. These bars may be swung upward, when large bundles are being conveyed, as they are secured at their upper ends in a bar 41, which is journaled at its ends in brackets 41ª, slidably arranged in a pair of standards 42. Stop fingers 44, in the bar 41, engage the standards 42 and prevent the bars 40 from dropping to a position lower than shown in Fig. 3. The brackets 41ª normally rest on a pair of collars 43, on the standards, but in case large or awkward bundles accumulate and choke the space between the upper parts of the conveyor and guide bars, then the bar 41 will raise sufficiently to permit such bundles to pass through and be delivered to the bundle basket, after which the guide bars will drop back to their normal position, as shown.

Figure 2:
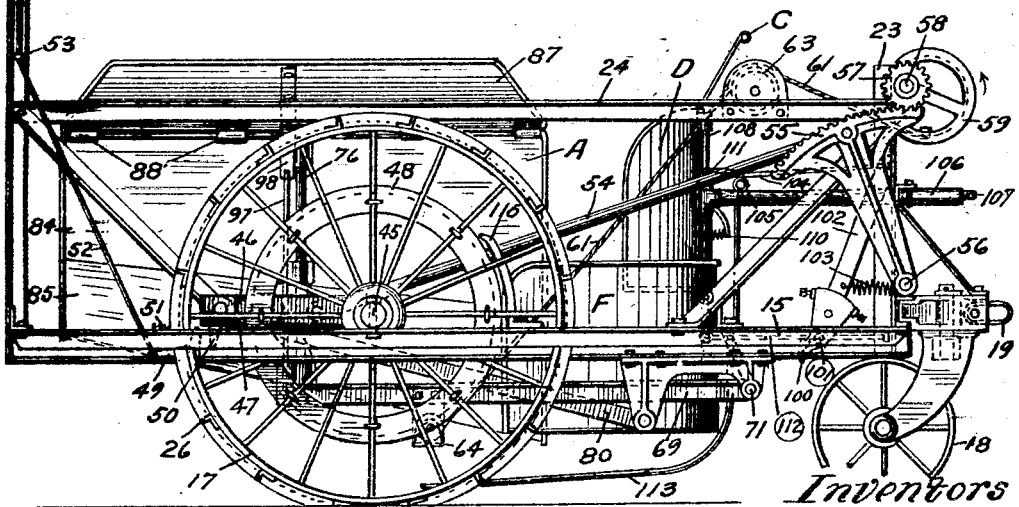
Fig. 2 is a right side elevation of the machine as shown in Fig. 1.
Figures 5, 6:
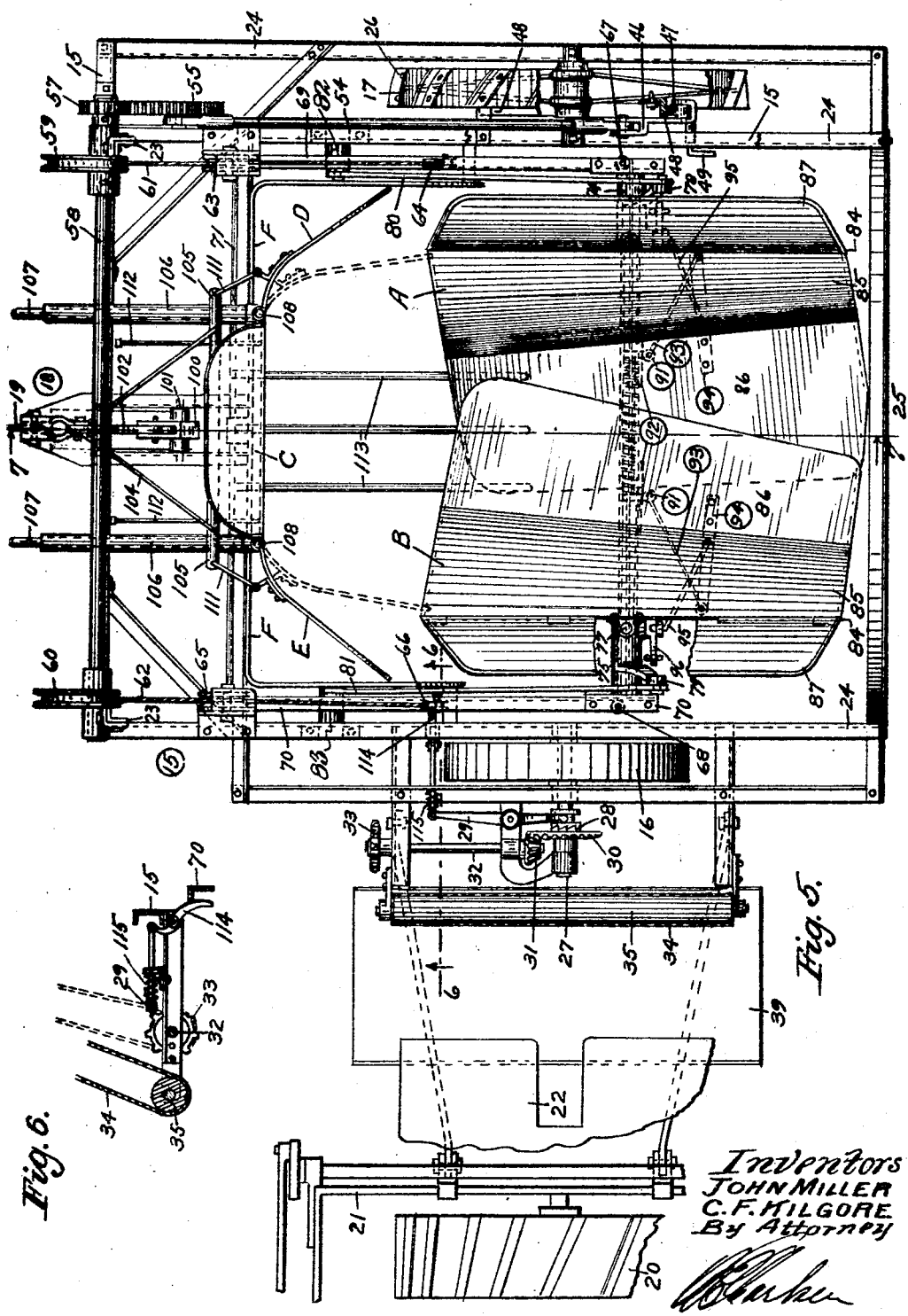
Fig. 5 is a top or plan view of the machine, some parts being removed or broken away.
Fig. 6 is a fractional section as seen substantially on the line 6—6 in Fig. 5.

Pivotally mounted, at one end, upon the shaft 45 of the wheel 17, is an actuating lever 46 which normally rests in the rearward horizontal position indicated in Figs. 1, 2 and 5. The outer end of this lever is provided with a pivotally secured friction dog 47, which, when moved in toward the shaft 45, will engage the periphery of a flanged rim 48, concentrically secured on the wheel 17, and travel circumferentially therewith until kicked out or released therefrom, as will later be described. The dog 47 is tripped into frictional or binding engagement with the flange rim 48, by a small bell crank lever 49, which is pivoted on the main frame of the machine. One arm of the lever 49 is adapted to press against an extending finger 50 of the dog 47, but is normally springheld therefrom by a spring 51, while the other arm of the lever is connected to one end of a cord or cable 52, which passes through suitable guides 53 and from these extends back to an accessible position for being pulled by the driver or operator of the binder. The cable 52 is pulled by the operator when a sufficient number of bundles have been received by the machine and a new shock is to be formed.

The lever 46 is connected to a segmental rack 55 by a long connecting rod 54, which, when actuated by the lever, imparts a corresponding oscillating movement to a segmental rack 55, which swings on and from a shaft 56. The rack 55 meshes with a pinion 57 on a shaft 58 which is journaled in a transverse position at the front end of the machine. Upon and near the ends of the shaft 58 are fixed a pair of sheaves 59 and 60, which are concentric with each other but are eccentric with respect to the shaft. A pair of cables 61 and 62 have their upper end secured to the respective sheaves so that they may be partly wound thereupon, when the shaft 58 is rotated. The purpose of arranging the sheaves eccentrically upon the shaft is to cause a uniform pull on the cables wound upon them, for, it will be noticed, that when the lever 46 starts from its rearward horizontal position it will affect a more powerful and slower movement to the bar 54 than when it approaches its vertical position above the shaft 45, when the motion imparted to the rack 55 will be greater while the power will be less. By arranging the sheaves as indicated it is obvious that the power and speed will be substantially equalized and the pulling action on the cables will be uniform, both as to power and speed, during the entire semicircular stroke, from rearward to forward position, of the lever 46.

From the sheaves 59 and 60, the cables 61 and 62 pass over pulleys 63, 64 and 65 and 66, respectively, which are stationary on the main frame, and to pulleys 67 and 68, respectively, at the rear corners of an auxiliary or basket frame.

The basket frame consists of a pair of side rails or bars 69 and 70, which are secured at their forward ends upon a transverse shaft 71, journaled in the main frame, while their rearward ends are connected by a transverse pipe 72, which has its ends journaled in the bars, and which is provided with a longitudinal centrally arranged slot 73. Members 74 and 75 are fixed upon and near the ends of the pipe 72, and are provided with parallel bars 76 and 77, to which are secured the basket sections. The members 74 and 75 are also provided with integral lever arms 78 and 79, which are connected, respectively, by link bars 80 and 81 to fixed centers 82 and 83 on the main frame. The members 69 and 70, and 80 and 81, are so arranged and proportioned that when the basket frame is raised to its uppermost position, as shown in Fig. 8, the link bars 80 and 81, will rotate the members 74, 75 with the pipe 72, and cause the bars 76, 77 to swing from their normal upward vertical position (as in Figs. 1, 2, 5, 9 and 10) to a downward vertical position, as shown in Fig. 8, thus reversing or turning the basket which is secured to the bars 76, 77, upside down.

The bundle basket consists, primarily, of two side sections A and B, which have vertical wall portions 84, lower inclined portions 85, overlapping bottom portions 86, and upper wings or closing portions 87, which are hinged as at 88 to the upper edges of the wall portions 84. The basket is tiltably mounted upon the pipe 72, for the turnover movement above described, and the basket sections A and B are also mounted upon the bars 76, 77 so as to swing on vertical pivots, so that the (normally) rearward end of the basket, which receives the head or grain end of the bundles, may be contracted together, to form the bundles into a shock, which is subsequently deposited upon the ground with the straw or tail end down. The wing portions 87 of the basket are normally swung outward, so as not to interfere with the bundles as they fall into the basket from above, when leaving the carrier, but these wings are turned inwardly, as shown in Figs. 9 and 10, when the shock is to be formed, and this movement is affected simultaneously with the closing in of the rear ends of the basket sections, with a result that the shock is formed into the desired substantially trunco-pyramidal shape before leaving the machine. The shock forming movements of the basket members is accomplished by the initial pull of the cables 61 and 62, the rear ends of which are connected to blocks 89 (within the pipe 72) which are normally spring actuated away from each other by a spring 90, in such a manner that when the cables are pulled (by the sheaves 59, 60) the blocks will be pulled together against the resistance of the spring. Integral with each block 89 is an ear 91, which projects out through the slot 73, and which has a plate 92 which guides upon the outside of the pipe.

The ears 91 are connected by links 93 to bars 94 extending laterally from and securedd rigidly to the bottom portions 86 of the basket. These links are arranged rearwardly of the pipe 72, so that when pulled in by the blocks 89 will contract the rear ends of the basket sections. The bars 94 are also connected by links 95 to the inner arms of bent or bell crank levers 96, which are respectively pivoted upon the members 74, 75. The outer arms of the bent levers 96 are connected by link bars 97 to short arms 98, rigidly projecting from the hinged basket members 87, so that as the rear ends of the basket sections are contracted the same means actuates the wings 87 inward, to form the shock as above described. When the cables 61 and 62 are released it is obvious that the spring 90 will return the basket to its receiving or original position, with the sections A and B substantially parallel and with the wings 87 again extended.

Figure 7:
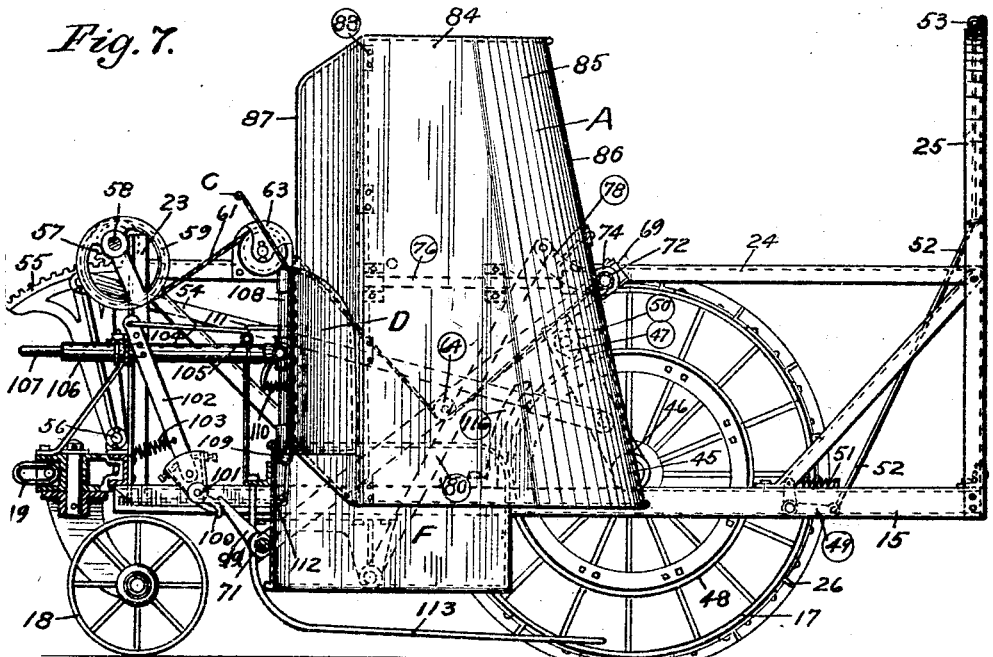
Fig. 7 is a sectional elevation of the machine as seen on the line 7—7 in Fig. 5, and with the bundle basket moved to its delivering position.
Figure 8:
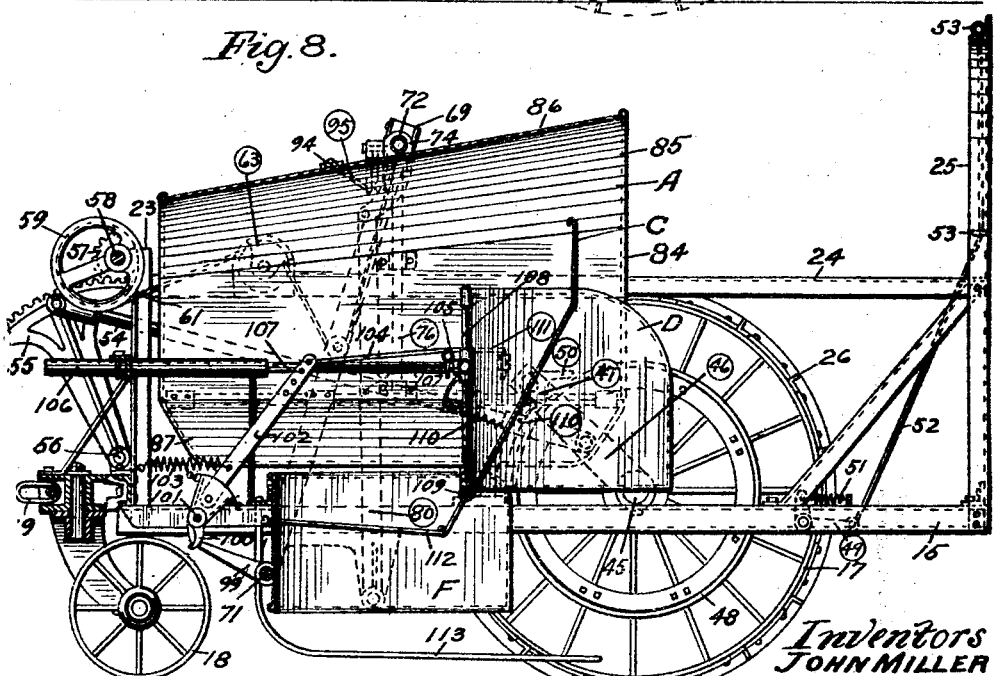
Fig. 8 is a sectional view similar to Fig. 7, but with the parts arranged in the position they will have when the shock has been delivered and the machine is about to pass over it and continue to form the next shock.

As the initial movement of the cables 61 and 62 and the shock forming operation are consummated, the cables become taut, and as the turning of the sheaves 59, 60 continues, the distance between the pulleys 63, 65, and 64, 66 shortens, raising the basket frame, the basket and its contents upwardly from the center 71 to its uppermost position, as indicated, progressively in Figs. 1, 7 and 8. During this movement a dog 99, on the rotating shaft 71, engages against a cam member 100, which is pivotally mounted as at 101, and in which is adjustably secured a lever 102, which is normally held rearward, with the cam in contact with the dog 99, by a spring 103. The upper end of the lever 102 is connected by a link bail 104 to a transversely arranged cross bar 105 which rests and slides upon a pair of stationary and parallel tubular supports 106. Bars 107 are slidably arranged in the supports 106 and are suitably fixed at their forward ends to a pair of vertical bars 108, these bars 108 are rigidly connected and made integral at their lower ends by a transverse bar 109, upon which is tiltably mounted what may be termed a displacing section C which is normally held in a vertical position by a spring 110. Laterally adjacent to the section C, and pivotally mounted upon the bars 108 are a pair of what may be termed gathering sections D and E. The sections D and E are connected by short links 111 to the ends of the bar 105, and the section C is provided, below the shaft 109, with a pair of headed rods 112, which have a limited sliding movement in a member F. Now, when the basket frame starts to rise, the dog 99 engages the cam 100, and pushes the lever 102 the bail rods 104 and the transverse bar 105 rearward. This movement, by reason of the links 111, swings the gathering sections D and E inwardly until they can pass within the vertical portions 84 of the bundle basket, at which time the bar 105 meets the bars 108, and, as it continues in its rearwardly direction, it causes the entire mechanism C, D, E, 108, 109, 110, 111 and 112 to move rearwardly with the bars 107 which slide out of the supports 106. The parts are so arranged and proportioned that the speed of this mechanism rearward is the same as the speed of the entire machine forward, so that the sections D, C and E will hold the delivered shock in a stationary position until it is entirely free of the basket, which simultaneously advances to its ultimate delivery position as indicated in Fig. 8. It may here be stated that the complete shock is first delivered upon a series of rearwardly extending rigid tines 113, and is additionally guided and supported when being turned to its vertical position by a vertical substantially U-shaped guard plate F which is rigidly arranged in the lower front end of the machine.

Before the sections C, D and E fully complete their rearward movement in sliding the shock off of the tines 113 (or rather in permitting the tines to be pulled out from under the shock) it may be noted (Fig. 8) that the heads of the rods 112 meet the guard F, and as the shaft 109 continues it causes the section C to tilt forward upon the top of the shock, thus assisting in releasing the shock and settling it down upon the ground.

As the entire shocking operation is completed, the dog 47, which is riding on and with the flange 48 of the wheel 17, advances to the point indicated by dotted lines in Fig. 8, where it is kicked out of frictional or binding engagement with the flange by a finger 116, and when this occurs all the parts are free to return to their initial positions, which they will do by reason of the weight of the basket frame, and the springs 110, 103, 51, and 90, when the machine is in readiness to make another shock.

It may here be noted, with particular reference to Figs. 5 and 6, that, as the basket frame 70 leaves its normal horizontal position, to form a shock, it releases a lever 114, and permits a spring 115, acting against the lever 29, to throw the clutch 28 out, and thus render the bundle carrier inoperative, but as soon as the basket is restored to its normal receiving position the bar 70 again engages the lever 114, and throws the clutch into engagement so that the carrier may continue with delivering bundles for the next shock to be made.

It is understood that various and suitable modifications may be made in the general and structural details of the invention, as herein set forth and described; provided, however, that such modifications come within the spirit and scope of the appended claims.

Having now therefore fully shown and described our invention, what we claim to be new and desire to protect by Letters Patent is:

1. A shocking machine including a wheel supported main frame, said frame consisting of side sections, a front section connecting the side sections, and an arched member connecting the rear ends of the side sections, a normally open tiltably mounted bundle basket arranged forwardly of the arch, and adapted to be contracted to form a shock, means for contracting the basket and for tilting it to deliver the shock thereunder, and means for raising the basket so that it and the arched member may pass over the shock as the machine advances.

2. In a shocking machine a wheel supported frame, a basket for receiving grain bundles and forming them into shocks, said basket consisting primarily of a pair of co-acting sections, vertically adjustable means for tiltably supporting the basket, and means for pivotally mounting the basket sections so they may swing on normally vertical, parallel axes.

3. In a machine of the character described, a main frame, a basket frame pivotally connected at one end to the main frame, a basket tiltably mounted upon the other end of the basket frame, said basket comprising a pair of co-operating side sections, an actuating mechanism, means operative upon an initial movement of the actuating mechanism to contract adjacent ends of the basket sections toward each other, and means operative upon a secondary movement of the actuating mechanism to raise the basket frame and tilt the basket.

4. In a shocking machine having a wheel supported frame, a basket tiltably mounted in the frame and adapted to receive grain bundles, said basket consisting of a pair of angularly adjustable sections, an actuating mechanism adapted upon an initial movement to angularly adjust the basket sections to form the bundles therein into a shock, and means operative upon a secondary movement of the actuating mechanism to tilt the basket to deliver the shock.

5. In a shocking machine, a bundle basket tiltably mounted therein, said basket consisting of a pair of sections adjustably secured upon normally vertical axes so that their rear ends may be contracted together, receiving members arranged to receive shocks formed by the basket when the latter is tilted, and rearwardly actuable means adapted to remove the shock from the receiving members when the same has been delivered thereto by the tilting of the basket.

6. In a shocking machine, a main frame, a secondary frame pivotally mounted in the main frame, shock forming members tiltably mounted on the secondary frame, recieving members rigidly arranged under the machine, means for actuating the shock forming members to form a shock and to tilt the shock forming members and raise the secondary frame to deliver the formed shock onto said receiving members, and means to remove the shock rearwardly from the receiving members onto the ground.

7. In a shocking machine, a main frame, a secondary frame pivotally mounted in the main frame, shock forming members tiltably mounted on the secondary frame, receiving members rigidly arranged under the machine, means for actuating the shock forming members to form a shock and to tilt the shock forming members and raise the secondary frame to deliver the formed shock onto said receiving members, means to remove the shock rearwardly from the said receiving members onto the ground, and means to actuate said shock removing means rearwardly at the same speed as the machine is moved forwardly.

8. In a shocking machine, a main frame, a secondary frame pivotally mounted in the main frame, shock forming members tiltably mounted on the secondary frame, receiving members rigidly arranged under the machine, means for actuating the shock forming members to form a shock and to tilt the shock forming members and raise the secondary frame to deliver the formed shock onto said receiving members, means to remove the shock rearwardly from the said receiving members onto the ground, and means operatively connected with the secondary frame to actuate said shock removing means rearwardly at the same speed as the machine is moved forwardly.

9. In a machine of the character described a main frame, a basket frame pivotally connected at one end to the main frame, a basket tiltably mounted upon the other end of the basket frame, said basket comprising a pair of co-operating side sections, an actuating mechanism, means operative upon an initial movement of the actuating mechanism to contract adjacent ends of the basket sections toward each other, means operative upon a secondary movement of the actuating mechanism to raise the basket frame and tilt the basket, and receiving means aranged rigidly under the machine and in a receiving position with respect to the basket.

10. In a shocking machine, a wheel supported frame having a forwardly tiltable shock forming basket arranged therein, rearwardly extending receiving members arranged under the machine to receive shocks formed and delivered by said basket, a normally vertical tiltably mounted displacing device arranged for horizontal movement over the receiving members, means for actuating the basket to deliver a completed shock to said receiving members therefrom, means for moving the displacing device rearwardly to dislodge the shock from the receiving device, and means to tilt the displacing device when the same has reached a predetermined rearward position.

11. The combination in a machine of the character described, of a wheel supported frame, rearwardly extending receiving means rigidly secured thereunder, means on the frame for receiving bundles, forming them into a shock and delivering the same to said receiving means, a shock displacing means for moving the shock off of the receiving means, said displacing means being movable rearwardly with respect to the machine and at the same speed as the machine proper moves forwardly.

12. The combination in a machine of the character described, of a wheel supported frame, rearwardly extending receiving means rigidly secured thereunder, means on the frame for receiving bundles, forming them into a shock and delivering the same to said receiving means, a shock displacing means, a guard arranged forwardly of and lower than the displacing means, said displacing means movable rearwardly with respect to the machine and at the same speed as the machine proper moves forwardly.

13. The combination in a machine of the character described, of a wheel supported frame, rearwardly extending receiving means secured thereunder, means on the frame for receiving bundles, forming them into a shock and delivering the same to said receiving means, a stationary guard arranged forwardly of the shock forming means and transversely above the receiving means, a shock displacing means for moving the shock off of the receiving means, said displacing means being movable rearwardly with respect to the machine and at the same speed as the machine proper moves forwardly.

14. The combination in a machine of the character described, of a wheel supported frame, rearwardly extending receiving means secured thereunder, means on the frame for receiving bundles, forming them into a shock and delivering the same to said receiving means, a shock displacing means for moving the shock off of the receiving means, said displacing means being movable rearwardly with respect to the machine and at the same speed as the machine moves forwardly, said displacing means consisting of a rearwardly tiltable displacing member and a pair of laterally arranged gathering members.

15. The combination in a shocking machine, of a wheel supported frame, shock forming means vertically and tiltably movable in the frame, displacing means arranged forwardly of the shock forming means and mounted to move longitudinally in the frame in co-operation with the shock forming means, said displacing means consisting of a centrally arranged displacing member and a pair of gathering members mounted to swing on vertically arranged bars at the sides of the displacing member, means controlled by the movement of the shock forming means to move the gathering members inwardly and to actuate the displacing means rearwardly.

16. The combination with a shocking machine, of a bundle basket tiltably mounted in the machine and consisting of a pair of side sections mounted to swing on normally vertical pivots, said side members having overlapping bottom members and hingedly secured top members, means for simultaneously contracting adjacent ends of the side sections and turning in said top members to affect a substantially trunco-pyramidal form to the basket.

17. The combination with a shocking machine, of a bundle basket tiltably mounted in the machine and consisting of a plurality of sections mounted to swing on vertical and horizontal centers, an actuating mechanism, means operated by an initial movement of the actuating mechanism to swing the basket sections on their respective centers to form a shock, and means operated by a secondary movement of the actuating mechanism to tilt the bundle basket to affect delivery of the shock.

18. In a shocking machine, a wheel supported main frame, a secondary frame pivotally mounted on the main frame, a pair of parallel normally vertical bars tiltably mounted on the secondary frame, a basket consisting of a pair of side sections respectively arranged to swing on said bars, means for swinging the basket sections to form a shock, and means to raise the secondary frame and tilt the basket and bars forwardly to affect delivery of the shock from the basket.

19. In a machine of the character described, a main frame supported on ground wheels, a shocking mechanism arranged on the frame and operated by cables, a flanged rim concentrically secured on one of the ground wheels, a lever member pivotally secured at one end upon the axis of said wheel, a friction dog at the other end of said lever for engagement with said rim, means for engaging and disengaging the dog with said rim, and an operative connection between said lever and said cables whereby the former will actuate the latter when said dog is in engagement with said rim.

20. In a machine of the character described, a main frame supported on ground wheels, a shocking mechanism arranged on the frame and operated by cables, a flanged rim concentrically secured on one of the ground wheels, a lever member pivotally secured so as to swing radially with respect to said wheel, a dog on said lever for engagement with said rim, means for engaging and disengaging the dog with said rim, a shaft journaled in the machine, pulleys arranged on the shaft to actuate said cables, and means actuated by said lever for rotating said shaft.

21. In a machine of the character described a main frame supported on ground wheels, a shocking mechanism arranged on the frame and operated by cables, a flanged rim concentrically secured on one of the ground wheels, a lever member pivotally mounted to swing radially with respect to said wheel, a dog on said lever for engagement with said rim, means for engaging and disengaging the dog with said rim, a shaft journaled in the machine and having a pinion thereon, a segmental rack in gear with said pinion, operative connection between said rack and lever, and means on the shaft to actuate said pulleys.

22. In a machine of the character described a main frame supported on ground wheels, a shocking mechanism arranged on the frame, cables for operating the mechanism, a shaft journaled in the frame, sheaves eccentrically secured on the shaft to operate said cables, a lever member arranged to rotate radially with respect to one of the ground wheels, means for connecting and disconnecting the lever with said wheel while the machine is in motion, and means operatively controlled by the lever member for rotating said shaft.

23. The combination with a shocking machine having a basket adapted to receive bundles and form them into shocks, of an endless carrier arranged on the machine to receive grain bundles and deliver them up into the basket, guard members arranged over and spaced from the carrier, and means for hingedly and slidably mounting said guard members so they may swing outwardly or slide upwardly from their normally spaced position above the carrier.

In testimony whereof we affix our signatures.

JOHN MILLER.
CHARLES F. KILGORE.

Certificate of Correction.

It is hereby certified that Letters Patent No. 1,552,633, granted September 8, 1925, upon the application of John Miller, of Calvin, North Dakota, and Charles F. Kilgore, of Minneapolis, Minnesota, for an improvement in "Shocking Machines," were erroneously issued by direct and mesne assignments of one-fifteenth to Mark I. Forkner and one-fifteenth to Bert E. Groom, both of Langdon, North Dakota; two-fifteenths to H. L. Hogan, four-fifteenths to E. H. Larson, and one-fifteenth to George Brown, all of Clyde, North Dakota; two-fifteenths to W. L. Thomas and two-fifteenths to Henry Schultz, both of Calvin, North Dakota, whereas said Letters Patent should have been issued by direct and mesne assignments of *two-fifteenths to said Miller; one-fifteenth to Mark I. Forkner and one-fifteenth to Bert E. Groom, both of Langdon, North Dakota; two-fifteenths to H. L. Hogan, four-fifteenths to E. H. Larson, and one-fifteenth to George Brown, all of Clyde, North Dakota; two-fifteenths to W. L. Thomas and two-fifteenths to Henry Schultz, both of Calvin, North Dakota*, as shown by the records of assignments in this office; and that the said Letters Patent should be read with this correction therein that the same may conform to the record of the case in the Patent Office.

Signed and sealed this 13th day of October, A. D. 1925.

[SEAL.] 
KARL FENNING,
*Acting Commissioner of Patents.*